Patented Jan. 4, 1938

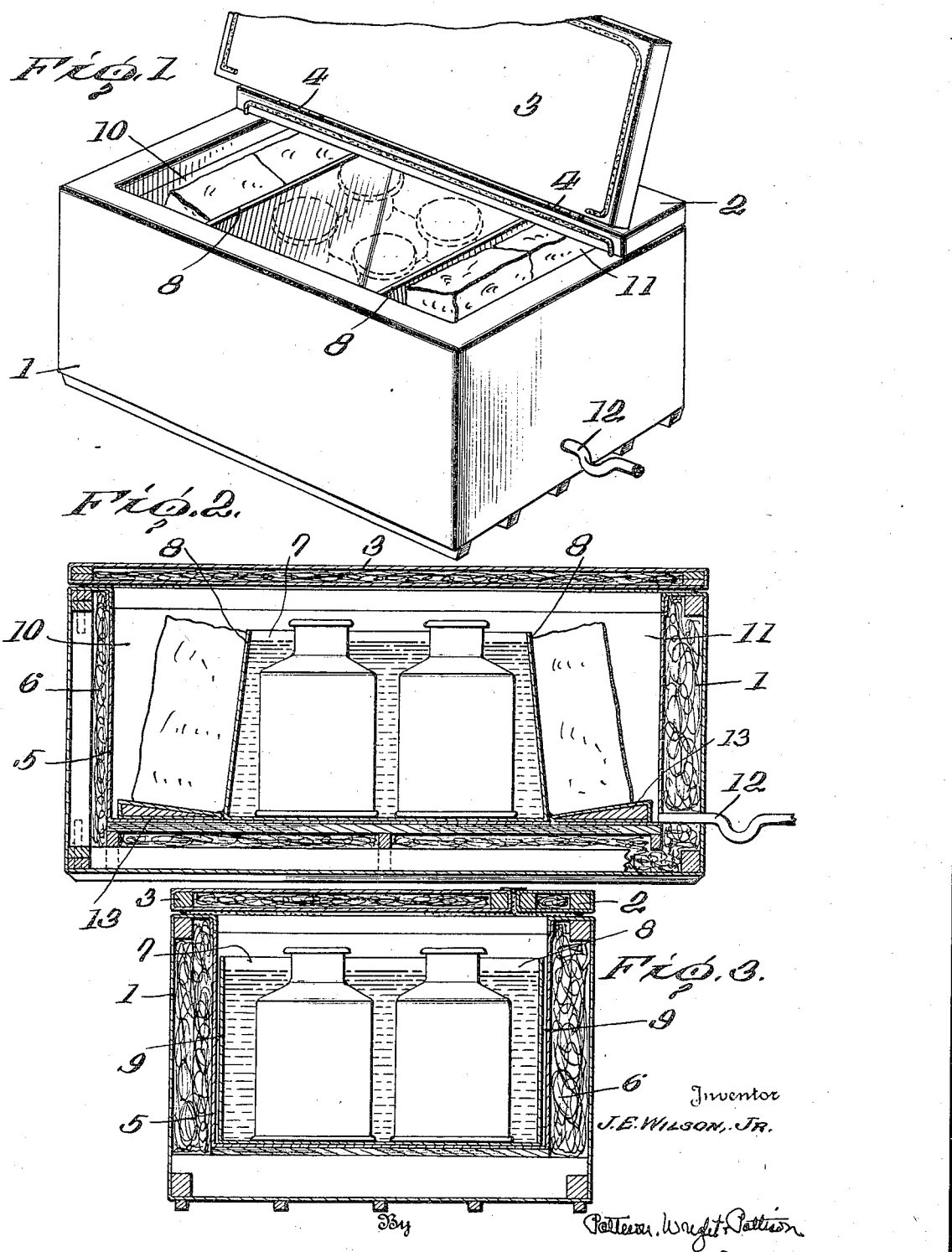

2,104,685

UNITED STATES PATENT OFFICE 2,104,685

STORAGE MILK COOLER

John E. Wilson, Jr., Smyrna, Del.

Application July 31, 1936, Serial No. 93,703

2 Claims. (Cl. 62—75)

This invention relates to a storage milk cooler especially adapted to be used for cooling and maintaining cans of milk at a low temperature, the object being to provide a cooler with a water container in which articles to be cooled are adapted to be placed having a wall arranged substantialy at right angles to the bottom of an ice compartment whereby the entire surface of one side of the cake of ice will be held by gravity in contact with the wall of the water container whereby the temperature of the water in the container can be maintained constantly at from 32° to 38° Fahrenheit.

Another object of my invention is to provide a milk cooler in the form of a cabinet which is provided with a central water container with an ice compartment at each end having removable tapering grids forming false bottoms to support cakes of ice in contact with the obliquely arranged walls of the water container whereby when the cakes of ice melt, they will be maintained in constant contact with the walls of the water container so as to expose the entire surface of one face of the cake of ice to the water container and I have found in practice that a standard size cake of ice, which is substantially 11½ inches in thickness will maintain this position as the cake melts until a thin sheet of ice of only approximately one inch remains within the ice compartment.

Another object of my invention is to provide a cooler which is exceedingly cheap to manufacture and one which is very strong and durable, the same being provided with a suitable drain for allowing the water from the melting ice to escape so as to maintain the blocks of ice in dry condition.

Other and further objects and advantages of the invention will be hereinafter set forth and the novel features thereof defined in the appended claims.

In the drawing,

Figure 1 is a perspective view of a cooler constructed in accordance with my invention showing the same partly broken away;

Figure 2 is a longitudinal section showing the cakes of ice in their normal position in respect to the water container; and Figure 3 is a transverse section through the same.

In the form of my invention as herein shown, I employ a rectangular cabinet 1 which is provided with a sectional top formed of a fixed section 2 and a movable section 3 herein shown connected to the fixed section by hinges 4 in order to allow the top to be swung upwardly to permit access to the interior of the cabinet.

The cabinet is provided with a metal lining 5 and insulated wall 6, the particular construction of which forms no part of my invention and while I have shown the cabinet provided with a sectional top, I wish it to be clearly understood that a top formed of a sufficient size to cover the complete cabinet can be used without departing from the spirit of my invention.

Disposed centrally within the cabinet is a water container 7 in which articles to be cooled are adapted to be placed and I have illustrated milk cans partly submerged within the water which forms a cooling fluid for cooling and maintaining the milk within the cans at the desired temperature.

The water container 7 is provided with obliquely arranged end walls 8 and is of such a size that it leaves a space 9 between the front and rear inner walls of the cabinet to allow cool air to circulate from one ice compartment 10 to the other ice compartment 11 formed by the central container and as herein shown, the ice compartment 11 is provided with a drain 12 having a trap so that the water from the melting ice within the ice compartments 10 and 11 will drain out as the space 9 formed between the lining and the water container forms a passage for the water from the compartment 10 to the compartment 11 and by spacing the water container from the walls of the cabinet, I provide cool air space.

The ice compartments 10 and 11 are provided with false bottoms in the form of tapering grids 13 which are herein shown formed of metal with tapering wood cores in order to form bottoms for the ice compartments at substantially right angles to the end walls of the water container 7 whereby rectangular blocks of ice as now manufactured and in universal use will have their entire side walls held in contact with the end walls of the water container by gravity so as to maintain the water within the water container at a lower temperature than would be the case if these walls were not at substantially right angles to one another as I have found by experimenting that when a block of ice is placed on an inclined support so as to maintain the ice in contact with the water container without a wall at substantially right angles to the support, the ice melts in a triangular shaped lump in the bottom of the cabinet away from the wall of the central container, thereby losing its efficiency as a cooling means for the water within the container.

In the embodiment of my invention as herein shown, the water container 7 is formed as a separate element and is placed in position within the cabinet before the fixed top section 2 is secured in position on the cabinet and while I have failed to illustrate any drain for the water container, it is, of course, understood that a suitable drain could be provided and suitable means for holding the water container in a predetermined position can be provided, but I have found in practice that the frictional contact between the bottom of the water container and the inner lining of the cabinet is sufficient to hold it in its position to prevent it from being displaced as the blocks of ice are placed in the ice compartments at each end.

From the foregoing description it will be seen that I have provided a cooling cabinet which is especially adapted to be used for cooling milk in cans, but it, of course, is understood that the cabinet can be used for cooling any articles in containers which can be partly submerged within the cooling fluid contained therein and therefore I do not wish to limit myself to the cooling of any particular article as my invention consists broadly in providing a cooling cabinet container containing a fluid in which articles to be cooled are adapted to be placed with a wall arranged substantially at right angles to the bottom of an ice compartment so as to maintain the entire surface of the cake of ice against the wall of the liquid container by gravity to increase the efficiency of the cabinet.

What I claim is:—

1. A milk cooler of the kind described comprising a cabinet having a movable top, said cabinet having insulated walls and a metal lining, a water container disposed in said cabinet and spaced from the inner face of the lining to provide ice compartments at each end of said cabinet and passages to each side of said container, said water container being provided with obliquely arranged walls and inclined false bottoms arranged within said ice compartments, the bottoms of said ice compartments being arranged at substantially right angles to the end walls of said water container.

2. A milk cooler, comprising an insulated cabinet having a movable cover, a water container disposed in said cabinet and spaced from the walls thereof to provide ice compartments, said water container having obliquely arranged walls each of which forms a wall of said ice compartments, the bottom of said ice compartments inclined towards the obliquely disposed walls of the water container whereby the ice compartment bottoms and the obliquely disposed water container walls are arranged at substantially right angles to one another for the purpose described, and said water container having an opening adjacent said movable cabinet cover to allow milk containers to be inserted into and removed from said water container.

JOHN E. WILSON, Jr.